US011954164B2

United States Patent
Cai et al.

(10) Patent No.: US 11,954,164 B2
(45) Date of Patent: Apr. 9, 2024

(54) ASYNCHRONOUS CONTENT SWITCHING

(71) Applicant: Microsoft Technology Licensing, LLC, Redmond, WA (US)

(72) Inventors: Tao Cai, Sunnyvale, CA (US); Hiroto Udagawa, Pleasanton, CA (US); Shunlin Liang, San Jose, CA (US); Xin Hu, Los Altos, CA (US); Yingxia Shi, Los Angeles, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 172 days.

(21) Appl. No.: 17/839,362

(22) Filed: Jun. 13, 2022

(65) Prior Publication Data

US 2023/0401267 A1    Dec. 14, 2023

(51) Int. Cl.
*G06F 16/9535*  (2019.01)
*G06F 16/2457*  (2019.01)

(52) U.S. Cl.
CPC .... *G06F 16/9535* (2019.01); *G06F 16/24578* (2019.01)

(58) Field of Classification Search
CPC ............ G06F 16/9535; G06F 16/24578
See application file for complete search history.

(56) References Cited

U.S. PATENT DOCUMENTS 9,817,846 B1*  11/2017  Srinivasan  ........ G06F 16/24578
2020/0073517 A1*  3/2020  Cai  ........................ G06F 3/0485

OTHER PUBLICATIONS

Petrescu, et al., "Client-side Ranking to More Efficiently Show People Stories in Feed", Oct. 20, 2016 [Retrieved From: https://engineering.fb.com/2016/10/20/networking-traffic/client-side-ranking-to-more-efficiently-show-people-stories-in-feed/ on Oct. 10, 2022], 5 Pages.

* cited by examiner

*Primary Examiner* — Apu M Mofiz
*Assistant Examiner* — Oscar Wehovz
(74) *Attorney, Agent, or Firm* — NICHOLSON DE VOS WEBSTER & ELLIOTT LLP

(57) ABSTRACT

Embodiments of the disclosed technologies receive a first signal from a user session and create a first ranked list of content items. Based on the first signal, a first subset of the first ranked list is assigned to a first set of slots of the user session. A second subset of the first ranked list is assigned to a second set of slots of the user session. Based on user activity data and position context data, a second ranked list of content items is created. The second ranked list is assigned instead of the second subset to the second plurality of slots.

18 Claims, 8 Drawing Sheets

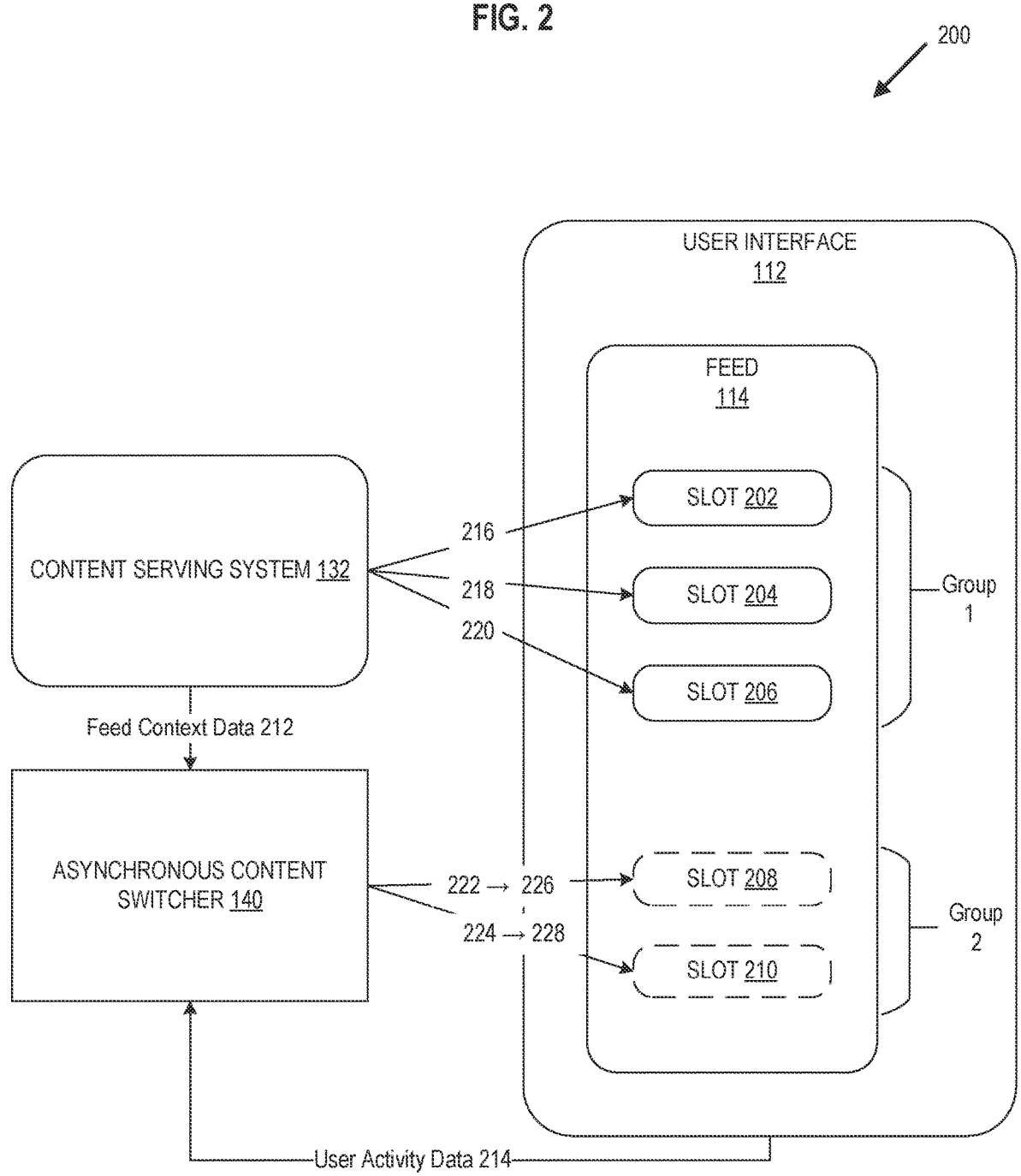

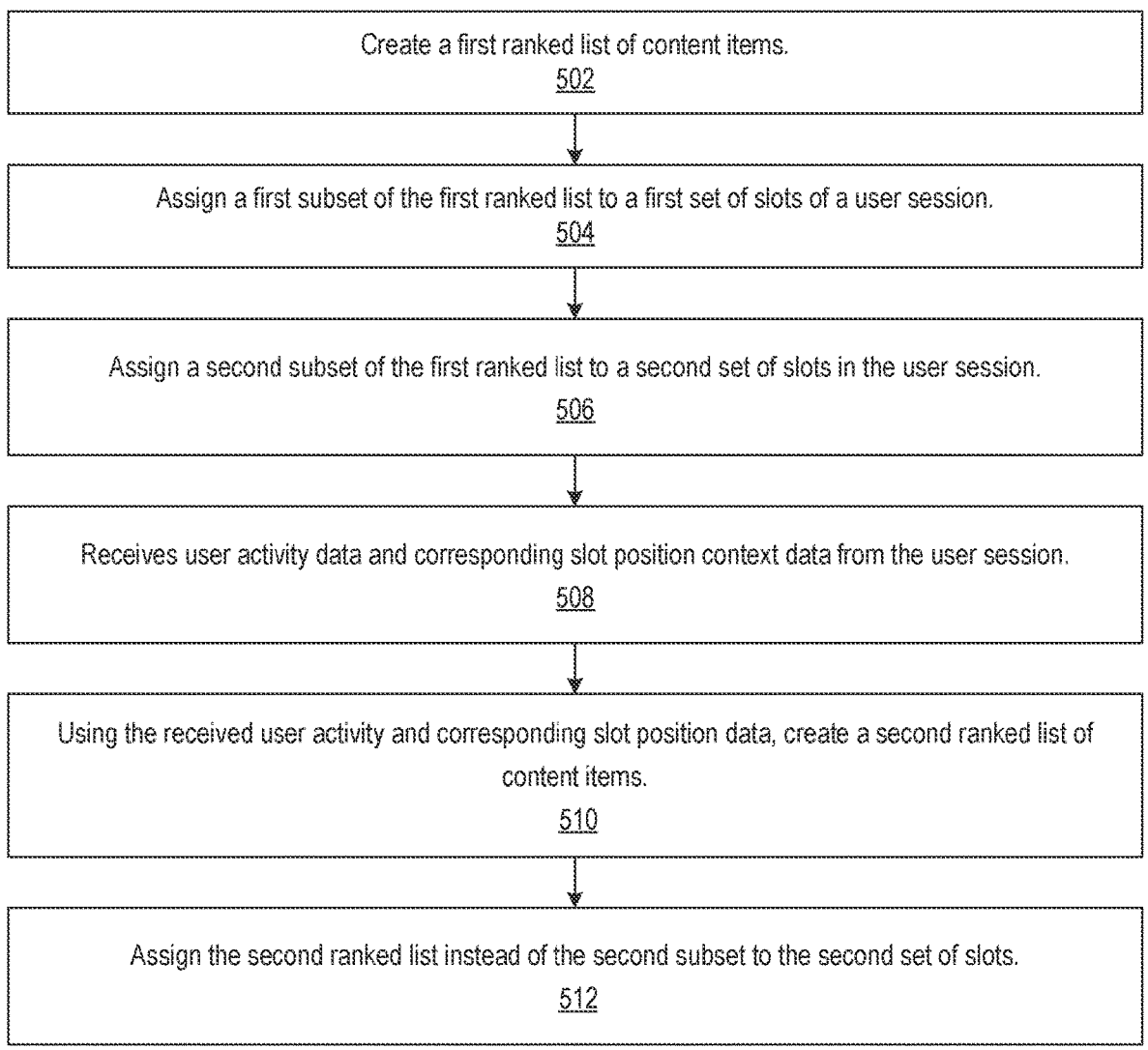

ASYNCHRONOUS CONTENT SWITCHING

TECHNICAL FIELD

A technical field to which the present disclosure relates is digital content distribution. Another technical field to which the present disclosure relates is the algorithmic ranking of digital content items for a digital content distribution.

BACKGROUND

Software applications use computer networks to distribute digital content to user computing devices. The performance of a digital content distribution system can be measured based on signals generated at the recipient user devices. An example of a performance measurement is whether or how well a particular content distribution reached its target audience when a particular ranking mechanism is used. Examples of signals include clicks, conversions, and other user interface events.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 is a flow diagram of an example method for switching content in accordance with some embodiments of the present disclosure.

FIG. 5 is a flow diagram of an example method for switching content in accordance with some embodiments of the present disclosure.

DETAILED DESCRIPTION

Figure 1:
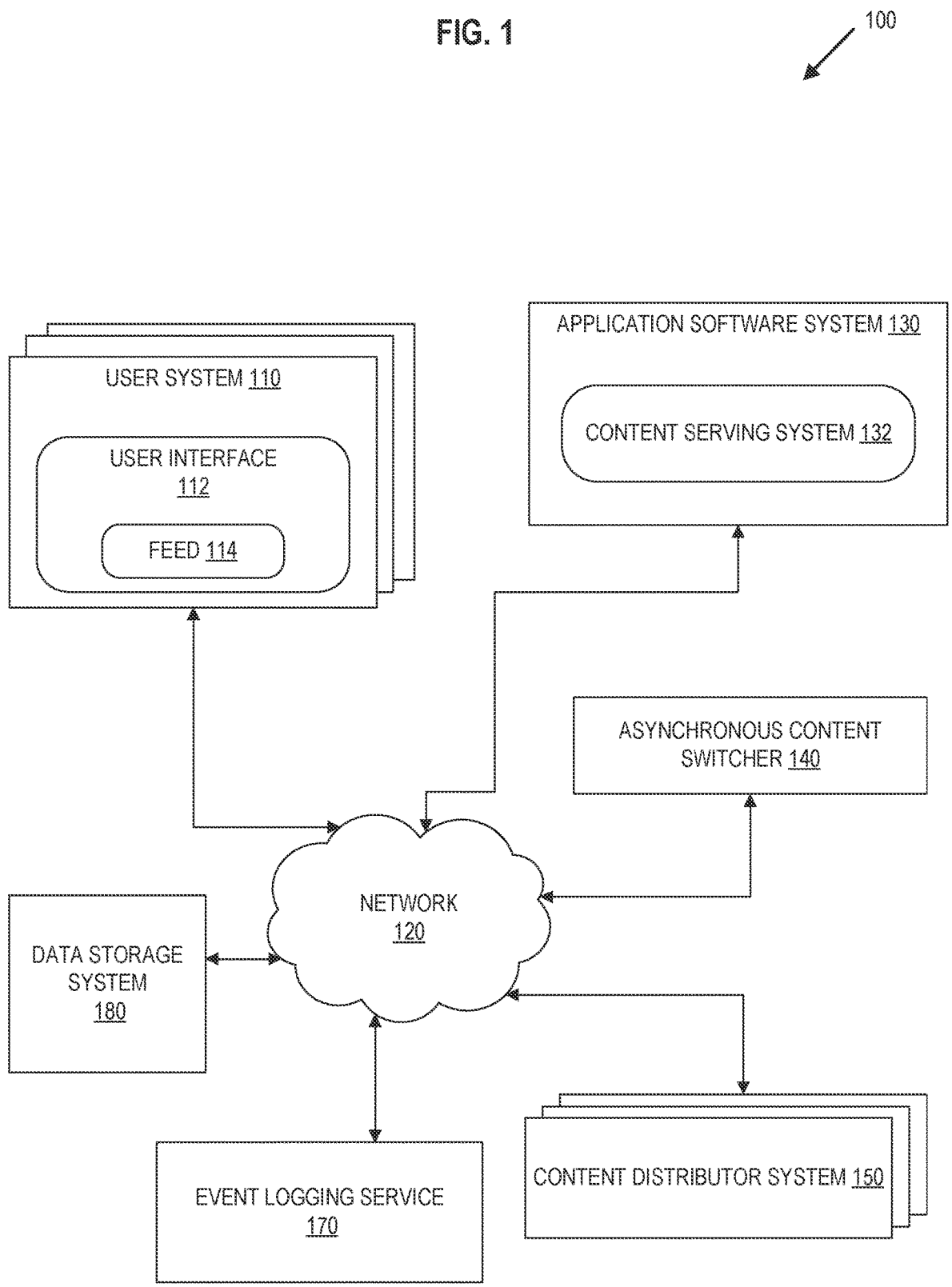
FIG. 1 illustrates an example computing system that includes an asynchronous content switcher in accordance with some embodiments of the present disclosure.

Aspects of the present disclosure are directed to providing a dynamic, real-time adaptable ranking mechanism for systems that distribute ranked lists of content items to user systems for display in ordered sets of user interface slots. An example of an ordered set of user interface slots is a feed, such as a news feed or social media feed. A feed is a series of slots into which content items are loaded. The slots typically are arranged one after the other. The feed is scrollable either horizontally or vertically. Other examples of ordered sets of user interface slots include other types of spatial arrangements of slots on a user interface, such as horizontal and/or vertical arrangements of pop-ups or notifications.

For ease of discussion, the term "feed" as used herein is not limited to the above-described types of feeds and includes any type of ordered set of user interface slots into which any number of content items of various different content item types can be loaded. For instance, a feed can include a mixture of organic content and sponsored content. Organic content as used herein refers to digital content items that users do not pay to have distributed by an application software system. Organic content includes, for example, the free content that users share with each other on social media platforms. Sponsored content as used herein refers to digital content items that entities pay to have distributed among users of the application software system. Sponsored content includes, for example, digital advertising. Digital content item as used herein includes text, video, graphics, audio, digital imagery, or any combination of any of the foregoing.

Existing feed ranking mechanisms generate ranked lists of content items that are loaded into a user's feed at the beginning of a session. These existing ranking mechanisms do not update the ranked lists during the user session. As a result, the contents of the user's feed are not updated during the session. Consequently, the most recent in-session signals, such as user interactions with items in the feed, are not incorporated into the ranking generated by the existing feed ranking mechanisms. For example, existing feed ranking mechanisms are unable to rank content based on the user's in-session activity associated with content loaded into particular slot positions of the feed. This is because, in the traditional systems, the ranked list of content items used to populate all of the slots of the entire feed is generated at the beginning of the user session and is not updated or modified as the session progresses.

In a feed application, to improve the ranking efficiency, the ranking mechanism can be divided into a two-pass ranking mechanism in which a set of first pass ranking mechanisms selects top-ranked content items within particular content types (e.g., top-ranked ads, top-ranked organic posts, videos, articles, etc.), and then a feed-mixer mixes all of the content items ranked by the multiple different content type-specific first pass ranking mechanisms to generate a final feed that is provided to a user's feed session on the front end. In traditional common practice, a first pass content ranking mechanism does not have access to and therefore can't learn contextual information that may be produced by other peer first pass rankers because all of the content type-specific first pass rankings are generated in parallel in order to achieve site-speed requirements.

Thus, a technical challenge is for feed ranking mechanisms to incorporate real-time, in-session contextual signals, such as user activity data and slot position context data, into the ranking process. Another technical challenge is for content distribution systems to change the contents of a feed dynamically during a user session without introducing latency issues that could detract from the user's experience with the feed.

Aspects of the present disclosure address the above and other deficiencies by providing an asynchronous serving architecture and an improved ranking mechanism that incorporates in-session, and in some embodiments, cross-session, contextual signals into the computation of ranking scores that are computed in-session. In-session refers to a user's current online session, and in-session signals correspond to user interface events that have occurred during a user's current online session. Cross-session refers to user interface events that occur in one or more other online sessions of the same user and/or user interface events that occur in one or more online sessions of other users.

The improved ranking mechanism can be used to select content items for individual slots based on contextual signals received for content items that have already been displayed in the feed. For example, the disclosed ranking mechanism can be used to re-rank content items that have been assigned to slots but are still unseen, based on the most recent user activity data (e.g., in-session and/or cross-session user activity data) and slot position context data.

Based on the in-session ranking, the disclosed mechanism can select a content item to be loaded into a next-to-be-displayed slot that is different from the content item that was previously assigned to that slot. As such, the dynamically adaptable ranking mechanism described herein can revise and update content item-to-slot assignments in real time based on user activity data and contextual data received from the user session in which a feed is presented. Examples of contextual data include the slot position of a content item in a feed, topics or metadata associated with content items in slot positions around (e.g., on either side of) the slot position of a content item in the feed, the format of a content item in the feed, images, video, or audio associated with a content item in the feed, etc. Additionally, the asynchronous architecture of the disclosed approach enables the dynamic in-session ranking to be performed repeatedly as new user activity signals are received from the feed.

The disclosed technologies are described in the context of online network-based digital content distribution systems. Any network-based application software system can act as a content distribution system. For example, news and entertainment apps installed on mobile devices, messaging systems, and social graph-based applications can all function as content distribution systems. An example of a content distribution use case is audience targeting for the distribution of advertisements for products and/or services over a social network.

In some embodiments, the disclosed technologies are used to rank content items of a specific type separately from the ranking of other types of content. For instance, the disclosed technologies can be used to rank sponsored content separately from the ranking of organic content. In other embodiments, the disclosed technologies are used to rank content items belonging to multiple different categories. For example, the disclosed technologies can be used to rank a mixture of sponsored content and organic content.

Aspects of the disclosed technologies are not limited to feeds, or to ads targeting, or to social network applications, but can be used to improve digital content distribution systems more generally. For example, the disclosed technologies are not limited to use in connection with social graph applications. The disclosed technologies can be employed by many different types of network-based applications in which content distribution is provided, including but not limited to various types and forms of application software systems.

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates an example computing system that includes an asynchronous content switcher in accordance with some embodiments of the present disclosure.

In the embodiment of FIG. 1, computing system 100 includes a user system 110, a network 120, an application software system 130, an asynchronous content switcher 140, a content distributor system 150, an event logging service 170, and a data storage system 180.

As described in more detail below, application software system 130 includes a content serving system 132. Content serving system 132 ranks digital content items and assigns the ranked digital content items to slots of a feed 114 of a particular user system 110. In some embodiments, content serving system 132 includes asynchronous content switcher 140. In other embodiments, asynchronous content switcher 140 is a separate component of application software system 130 or a separate component of computing system 100. For example, asynchronous content switcher 140 can be implemented as a network service that is called by content serving system 132.

Asynchronous content switcher 140 performed in-session ranking of one or more content items based on in-session context data such as user activity data and contextual data. For example, asynchronous content switcher 140 replaces a content item assigned to a particular slot by content serving system 132 with a different content item ranked more highly by asynchronous content switcher 140.

User system 110 includes at least one computing device, such as a personal computing device, a server, a mobile computing device, or a smart appliance. User system 110 includes at least one software application, including a user interface 112, installed on or accessible by a network to a computing device. In some embodiments, user interface 112 is or includes a front-end portion of application software system 130 and/or a front-end portion of content distributor system 150. For example, embodiments of user interface 112 include a graphical display screen that includes feed 114. Feed 114 includes one or more slots. A slot as used herein refers to a space on a graphical display such as a web page or mobile device screen, into which digital content may be loaded during a content distribution. The locations and dimensions of a particular slot on a screen are specified using, for example, a markup language such as HTML (Hypertext Markup Language). On a typical display screen, a slot is defined by two-dimensional coordinates; however, in a virtual reality, augmented reality, mixed reality, or robotic implementation, a slot may be defined using a three-dimensional coordinate system.

User interface 112 is any type of user interface as described above. User interface 112 can be used to input search queries and view or otherwise perceive output that includes data produced by application software system 130 or content distributor system 150. For example, user interface 112 can include a graphical user interface and/or a conversational voice/speech interface that includes mechanisms for scrolling and interacting with a news feed, entering a search query, and viewing query results and/or other digital content. Examples of user interface 112 include web browsers, command line interfaces, and mobile apps. User interface 112 as used herein can include application programming interfaces (APIs).

Application software system 130 is any type of application software system that provides or enables at least one form of digital content distribution to user systems such as user system 110. Examples of application software system 130 include but are not limited to connections network software, such as social media platforms, and systems that are or are not based on connections network software, such as general-purpose search engines, job search software, recruiter search software, sales assistance software, content distribution software, learning and education software, or any combination of any of the foregoing.

Content distributor system 150 is any type of application software system that provides digital content items for distribution to user systems through application software system 130. Examples of content distributor system 150 include but are not limited to any type of networked software application that generates or distributes sponsored content.

Event logging service 170 captures user interface events such as page loads and clicks in real time, and formulates the user interface events into a data stream that can be consumed by, for example, a stream processing system. For example, when a user of application software system 130 or content distributor system 150 clicks on a user interface control such as view, comment, share, like, or loads a web page, or scrolls through a feed, etc., event logging service 170 fires an event to capture an identifier, an event type, a date/timestamp at which the user interface event occurred, and possibly other information about the user interface event, such as the impression portal and/or the impression channel involved in the user interface event (e.g., device type, operating system, etc.). Event logging service 170 generates a data stream that includes one record of real-time event data for each user interface event that has occurred. Event logging service 170 captures user interface events on a per-session basis such that each session of each user of application software system 130 may generate an event stream that is captured by event logging service 170. As such, event logging service 170 can provide user interface event data for multiple users and sessions to other systems and services, such as asynchronous content switcher 140.

Time as used in the context of terminology such as real-time refers to a time delay introduced by the use of computer technology, e.g., by automated data processing and/or network transmission, where the time delay is the difference in time, as measured by a system clock, between the occurrence of an online event and the use of data processed in response to the event, such as for display, feedback, and/or control purposes.

Data storage system 180 includes data stores and/or data services that store digital content items, data received, used, manipulated, and produced by application software system 130 and/or content distributor system 150. Alternatively or in addition, data storage system 180 includes data stores and/or data services that store data received, used, manipulated, and produced by content switcher 140. In some embodiments, data storage system 180 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine.

Data stores of data storage system 180 can be configured to store data produced by real-time, near real-time (also referred to as nearline), and/or offline (e.g., batch) data processing. A data store configured for real-time data processing can be referred to as a real-time data store. A data store configured for near real-time data processing can be referred to as a near real-time data store or nearline data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 180 resides on at least one persistent and/or volatile storage device that can reside within the same local network as at least one other device of computing system 100 and/or in a network that is remote relative to at least one other device of computing system 100. Thus, although depicted as being included in computing system 100, portions of data storage system 180 can be part of computing system 100 or accessed by computing system 100 over a network, such as network 120.

While not specifically shown, it should be understood that any of user system 110, network 120, application software system 130, asynchronous content switcher 140, content distributor system 150, event logging service 170, and data storage system 180 includes an interface embodied as computer programming code stored in computer memory that when executed causes a computing device to enable bidirectional communication with any other of user system 110, network 120, application software system 130, asynchronous content switcher 140, content distributor system 150, event logging service 170, and data storage system 180 using a communicative coupling mechanism. Examples of communicative coupling mechanisms include network interfaces, inter-process communication (IPC) interfaces and application program interfaces (APIs).

A client portion of application software system 130 and/or content distributor system 150 can operate in user system 110, for example as a plugin or widget in a graphical user interface of a software application or as a web browser executing user interface 112. In an embodiment, a web browser transmits an HTTP request over a network (e.g., the Internet) in response to user input that is received through a user interface provided by the web application and displayed through the web browser. A server running application software system 130 and/or a server portion of application software system 130 can receive the input, perform at least one operation using the input, and return output using an HTTP response that the web browser receives and processes.

Each of user system 110, application software system 130, asynchronous content switcher 140, content distributor system 150, event logging service 170, and data storage system 180 is implemented using at least one computing device that is communicatively coupled to electronic communications network 120. Any of user system 110, application software system 130, asynchronous content switcher 140, content distributor system 150, event logging service 170, and data storage system 180 can be bidirectionally communicatively coupled by network 120. User system 110 as well as one or more different user systems (not shown) can be bidirectionally communicatively coupled to application software system 130 and/or content distributor system 150.

A typical user of user system 110 can be an administrator or end user of application software system 130, asynchronous content switcher 140, and/or content distributor system 150. User system 110 is configured to communicate bidirectionally with application software system 130, asynchronous content switcher 140, and/or content distributor system 150 over network 120.

The features and functionality of user system 110, application software system 130, asynchronous content switcher 140, content distributor system 150, event logging service 170, and data storage system 180 are implemented using computer software, hardware, or software and hardware, and can include combinations of automated functionality, data structures, and digital data, which are represented schematically in the figures. User system 110, application software system 130, asynchronous content switcher 140, content distributor system 150, event logging service 170, and data storage system 180 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Further details with regard to the operations of the asynchronous content switcher 140 are described below.

FIG. 2 is a flow diagram of an example method for switching content in accordance with some embodiments of the present disclosure.

The method 200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the application software system 130 of FIG. 1 in cooperation with asynchronous content switcher 140. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 2, in operation, content serving system 132 populates a first group of slots 202, 204, 206 (Group 1) of feed 114 with correspondingly ranked content items 216, 218, 220, at the start of a user session. Content serving system 132 detects the start of a user session by, for example, detecting a login or a page load request received from user interface 112. The content items 216, 218, 220 are assigned to the corresponding slots 202, 204, 206 by content serving system 132 using a first ranking mechanism. The number of slots in Group 1 corresponds to a visible portion of feed 114 that is actually displayed on the user interface 112.

Although not specifically shown in FIG. 2, content serving system 132 also assigns content items 222, 224 to a second group of corresponding slots 208, 210 (Group 2) at the start of the user session. However, as indicated by dashed lines, the Group 2 slots 208, 210 are as-yet unrendered; i.e., not included in the visible portion of feed 114 that is actually displayed on the user interface 112 at the start of the user session. For example, the content items 222, 224 assigned to the Group 2 slots by content serving system 132 are not shown unless or until the user activates a pagination mechanism, such as a scroll-to-load mechanism.

The number of slots in each of Group 1 and Group 2 is determined based on the requirements of a particular design or implementation of the method 200. For example, the number of slots is dependent upon the available screen real estate and/or the size of the available cache on a particular user device. In some embodiments, Group 2 includes the entire remaining portion of the feed 114 after the visible portion of Group 1, and the ranking process employed by content serving system 132 assigns content items to all of the slots of the entire feed (e.g., both Group 1 and Group 2) at the beginning of the user session. For example, content serving system 132 sends all of the Group 1 and Group 2 content items to user system 110 such that the user interface 112 renders the Group 1 content items and stores the Group 2 content items in a server-side cache.

After the user session has started and before the user session has ended, for example while the user is scrolling the feed 114, asynchronous content switcher 140 receives contextual signals such as feed context data 212 and user activity data 214. Asynchronous content switcher 140 receives the contextual signals directly from user interface 112 or indirectly through an intermediary system such as event logging service 170. Asynchronous content switcher 140 determines that the user session has ended by, for example, detecting a refresh signal received from user interface 112.

Feed context data 212 is generated by content serving system 132 as a result of the ranking process executed by content serving system 132. An example of feed context data 212 is a series of position identifier-content identifier pairs, where the position identifier identifies a slot position, and the content item identifier identifies a content item assigned by content serving system 132 to the slot position identified by the position identifier. Feed context data 212 includes additional data in some embodiments. For example, feed context data 212 can include content item metadata such as title, author, publication date, source, or keywords, as well as text, imagery, audio and/or graphics of the content item.

User activity data 214 is generated by user interface 112 as a result of user interactions with feed 114 and/or other portions of user interface 112. Examples of user activity data 214 include user interactions with one or more of the content items 216, 218, 220 in the visible slots 202, 204, 206; e.g., likes, shares, comments, etc. User activity data 214 is provided to asynchronous content switcher 140 directly from user interface 112 or indirectly through, e.g., event logging service 170. Thus, in some embodiments, user activity data 214 includes in-session user interface event data of a single user while in other embodiments, user activity data 214 includes cross-session user interface event data of the same user and/or one or more other users.

Asynchronous content switcher 140 incorporates the feed context data 212 and user activity data 214 into a second ranking mechanism that re-ranks the Group 2 content items alone or in combination with other content items that are not part of Group 2 or Group 1. For example, as described in more detail with reference to FIG. 3A, the second ranking mechanism can include other content items in the re-ranking that are not part of the Group 2 content items, such that the second ranking mechanism is applied to both content items that have been cached but not rendered at the user system and other content items obtained from another source, such as a data store of data storage system 180 or content items received from a content distributor system 150.

The in-session ranking by the second ranking mechanism of asynchronous content switcher 140 can cause the initial content item-to-slot assignments generated by content serving system 132 to change. For example, asynchronous content switcher 140 replaces content item 222 with a different content item 226 and replaces content item 224 with a different content item 228, before slots 208, 210 are rendered in the visible area of feed 114. Content items 226, 228 could be content items of Group 2 that were previously ranked lower than content items 222, 224 or content items 226, 228 could be other content items that were not included in Group 1, Group 2, or one or more other groups, at the start of the user session.

Figure 3A:
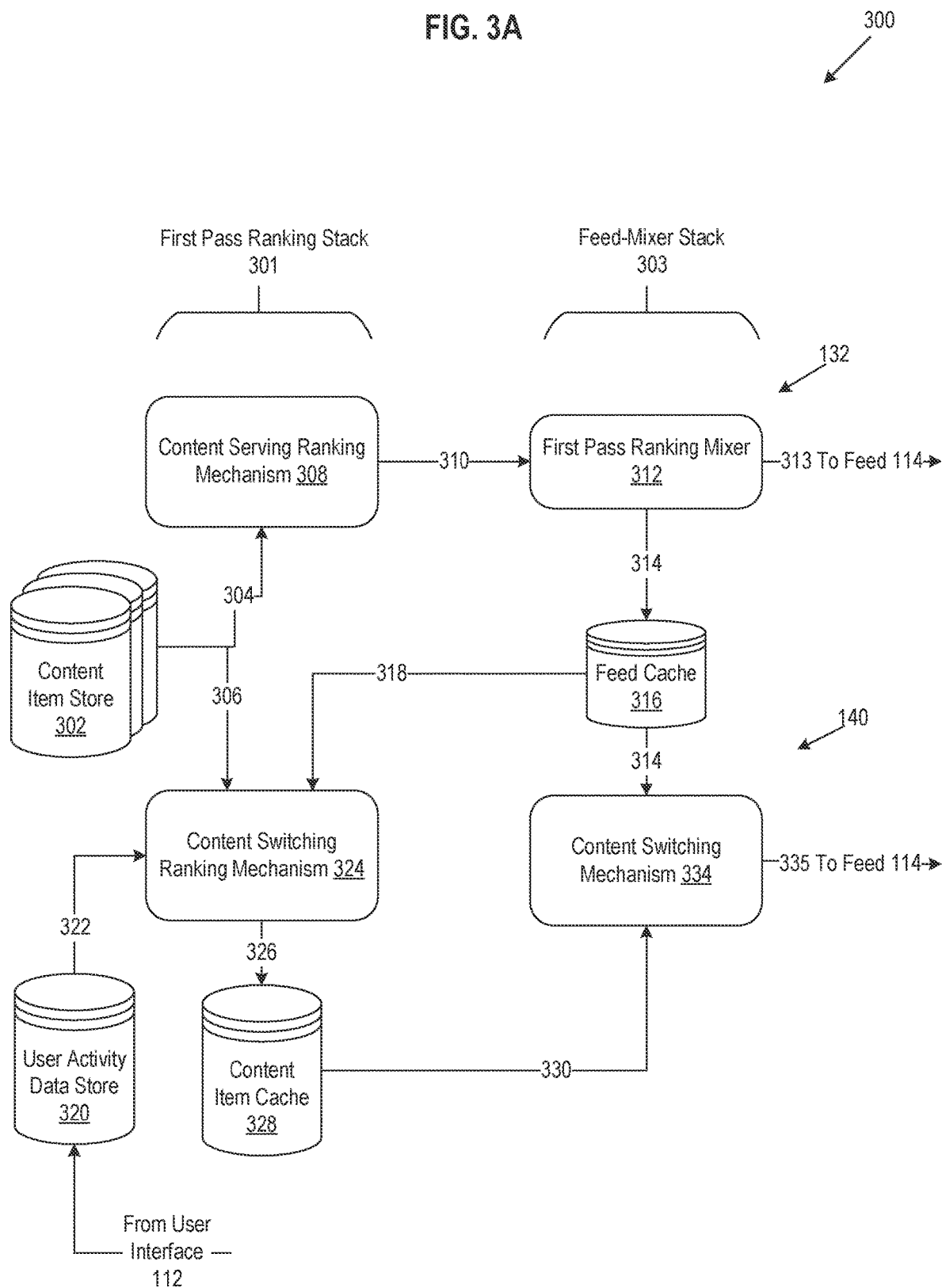
FIG. 3A is a flow diagram of an example method for switching content, in accordance with some embodiments of the present disclosure.

FIG. 3A is a flow diagram of an example method for switching content, in accordance with some embodiments of the present disclosure.

Portions of the method 300 are performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the content switcher 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 3A depicts an architecture that includes a first pass ranking stack 301 and a feed-mixer stack 303. First pass ranking stack 301 includes a content serving ranking mechanism 308 and a content switching ranking mechanism 324. Feed-mixer stack 303 includes first pass ranking mixer 312 and content switching mechanism 334. Content serving ranking mechanism 308 and first pass ranking mixer 312 are components of content serving mechanism 132, and content switching ranking mechanism 324 and content switching mechanism 334 are components of asynchronous content switcher 140, in some embodiments.

In operation, content serving ranking mechanism 308 receives or retrieves a first set of content items 304 from one or more content item stores 302. A particular content item store 302 contains, for example, content items of a particular type (e.g., ads, feed followers, or recommendations) or content items of a particular source (e.g., n-degree connections, where n is a positive integer, or a particular content distributor system 150). The one or more content item stores 302 are, for example, data stores of data storage system 180 or content distributor system 150.

Content serving ranking mechanism 308 ranks the content items obtained from the one or more content item stores 302 using a first ranking mechanism. In some embodiments, the first ranking mechanism is a session-based ranking mechanism that determines the order of content items to be shown in the feed for the entire session.

In some embodiments, content serving ranking mechanism 308 includes multiple different first pass ranking mechanisms, such as one first pass ranking mechanisms per content type, where each first pass ranker ranks content items of a particular type. In other embodiments, content serving ranking mechanism 308 includes a single ranking mechanism that ranks content items across multiple different content types. In embodiments that include multiple first pass rankers, content serving ranking mechanism produces the output of each first pass ranker, e.g., a separate ranked list for each content type.

In some promotion-oriented embodiments (e.g., ads), the first ranking mechanism ranks content items using a session-based auction process that computes a score for each content item based on a session-based effective cost per impression (ecpi) algorithm and ranks the content items according to the session-based ecpi score (e.g., highest ranked content item has the highest score). An example of a session-based ecpi algorithm is: $ecpi=P(response_{pos}|user, content)*b_{content}$, where $response_{pos}$ is a user interaction (response) with a content item loaded into a particular slot position, pos is the slot position of the content item, user is the user identifier, content is the content item identifier, and $b_{content}$ is a multiplier associated with the content item, which may be determined based on an auction process.

In some embodiments, the score computed by the first ranking mechanism is a probabilistic value. For example, in some embodiments, the first ranking mechanism outputs a probability of a user interacting with a content item given the user's profile data, the content item's metadata, and a cost factor.

In some embodiments, the score generated by the first ranking mechanism is converted to a label that corresponds to a slot position in feed 114. For example, the content item with a score of 0.9 could be labeled 1, signifying that the content item should be inserted into the highest slot, e.g., the first slot to be shown in the feed.

Content serving ranking mechanism 308 produces a first ranked list 310. First ranked list is an ordered version of the set of content items 304. First pass ranking mixer 312 generates a first subset 313 of the first ranked list, which is loaded into feed 114. The first subset 313 are content items that are assigned to the top n slots of the feed 114, where n is a positive integer corresponding to the number of visible slots in the feed 114. For example, if the feed 114 is capable of displaying three feed items at a time, then n=3 and the first subset 313 contains the first three content items selected from the top of the first ranked list 310. Stated another way, the first subset 313 corresponds to the Group 1 content items of FIG. 2.

As noted above, some implementations include multiple different first pass rankers; for example one first pass ranker per content type. In other embodiments, there is only a single first pass ranker that performs a ranking of content items. For simplification, the below description refers to implementations in which a first pass ranking mixer 312 mixes the output produced by multiple first pass rankers. In other embodiments having only a single first pass ranker, first pass ranking mixer 312 is omitted, or first pass ranking mixer 312 may re-rank the output of the first pass ranker.

In the illustrated embodiment, first pass ranking mixer 312 mixes multiple first pass ranking results produced by multiple different first pass rankers, and generates the final rank-ordered contents of the feed to be displayed to the user, such that the final feed contains a mixture of the results produced by the multiple different first pass ranking mechanisms. First pass ranking mixer 312 stores a second subset 314 of the first ranked list 310 and corresponding contextual data (e.g., slot position data, etc.) in a feed cache 316. In embodiments in which first pass ranking mixer 312 is omitted, the first pass ranker would write content items and contextual data to feed cache 316.

The second subset 314 are content items that are not part of the first subset 313. Thus, the second subset 314 contains content items that are ranked n+1 or lower by the content serving ranking mechanism 308. Content items in the second subset 314 are available to first pass ranking mixer 312 for loading into the visible portion of feed 114 after the first subset 313; for example in response to a subsequent pagination call.

Content switching ranking mechanism 324 operates a second ranking mechanism asynchronously while the first subset 313 is being displayed in feed 114. Content switching ranking mechanism 324 retrieves or receives feed context data 318 (e.g., slot position context data) for the content items of the second subset 314 from feed cache 316. Content switching ranking mechanism 324 also retrieves or receives a set of content items 306 from the one or more content item stores 302, in some embodiments. The set of content items 306 is different than the set of content items 304 provided to content serving ranking mechanism 308. For example, the set of content items 306 does not include any of the content items included in the first ranked list 310 (and thus, does not include any of the rendered content, e.g., first subset 313).

Content switching ranking mechanism 324 also receives or retrieves session-specific user activity data 322 from user activity data store 320. User activity data store 320 is a real-time data store or a near-real time data store that records streams of user interface event data from user interface 112, in some embodiments. Session-specific user activity data 322 includes data pertaining to user interactions with feed 114 during the current user session. For example, session-specific user activity data 322 includes user interface event data associated with the first subset of content items 313 and associated contextual signals from other first pass ranking content; for instance, a record of user interface activity data 322 (e.g., like, share) associated with other content items ranked by the content serving ranking mechanism. In some embodiments, user activity data store 320 includes only in-session user interface event data of a single user while in other embodiments, user activity data store 320 includes cross-session user interface event data of the same user and/or one or more other users. User activity data store 320 may be a component of event logging service 170 or a separate data store that receives user activity data from event logging service 170, for example.

Content switching ranking mechanism 324 applies the second ranking mechanism to the content items 306, 314 based on the feed context data 318 and the user activity data 322. In some embodiments, the second ranking mechanism is a position-based ranking mechanism that determines the particular content item to be shown in a particular slot of feed 114.

In some embodiments, the second ranking mechanism ranks content items using a position-based auction process that computes a score for each content item based on a position-based expected cost per impression (ecpi) algorithm and ranks the content items according to the position-based ecpi score (e.g., highest ranked content item has the highest score).

Examples of contextual data include metadata adjacent to the slot position. For example, a picture (e.g., digital image or graphic), a topic of the post, or the format of the content (e.g., text, image, video) contained in the post. Examples of user activities includes user interactions with the content (e.g., like, comment).

In some embodiments, the score computed by the second ranking mechanism is a probabilistic value. For example, in some embodiments, the second ranking mechanism outputs a probability of a user interacting with a content item given the user's profile data, the content item's metadata, the feed context data 318 (e.g., slot position context data), the user activity data 322, and a cost factor. Access to the feed cache 316 enables content switching ranking mechanism 324 to incorporate context data relating to preceding slots into the second ranking mechanism.

In some embodiments, a score generated by the second ranking mechanism is converted to a label that corresponds to a slot position in feed 114. For example, the content item with a score of 0.9 could be labeled n+1, signifying that the content item should be inserted into the highest available slot, e.g., the first slot to be shown in the feed 114 after the first subset 313.

Content switching ranking mechanism 324 produces a second ranked list 326. Second ranked list is the ordered version of the content items 306, 314 produced using the second ranking mechanism. Content switching ranking mechanism 324 stores the second ranked list 326 in a content item cache 328. Content item cache 328 is accessed by content switching mechanism 334 in real time during the user session. For example, a pagination signal from user interface 112 could trigger content switching mechanism 334 to access content item cache 328.

Content switching mechanism 334 compares the scores of the content items in the second ranked list 326 (where those scores are generated by the second ranking mechanism) to the scores of the content items in the second subset 314 (where those scores are generated by the first ranking mechanism). Content switching mechanism 334 accesses feed cache 316 to obtain the score information produced by the first ranking mechanism for the second subset 314.

Based on these score comparisons, content switching mechanism 334 can replace the second subset 314 with the second ranked list 324. Replacing the second subset 314 with the second ranked list 324 can include, for example, replacing one or more items of the second subset 314 with one or more items 330 of the second ranked list 326 that has a higher score. Alternatively or in addition, replacing the second subset 314 with the second ranked list 324 can include reordering the content items of the second subset 314 or adding one or more items 330 of the second ranked list 326 to the second subset 314. In this way, after the initial load of the first subset 313, subsequent loads 335 of content items into the feed 114 can be produced by content switching mechanism 334 rather than by first pass ranking mixer 312.

In some embodiments, the score comparison performed by content switching ranking mechanism 324 includes comparing the score to a limit value. If a content item's score exceeds the limit value, the content item is removed from the set of content items that are available for insertion into the feed. The limit value is determined, for example, based on requirements associated with particular content distributor systems. The limit value may correspond to a maximum number of content items of a particular type that can be inserted into the feed for a particular content distributor or a maximum amount of time that a content item can be shown in the feed for a particular content distributor.

Figure 3B:
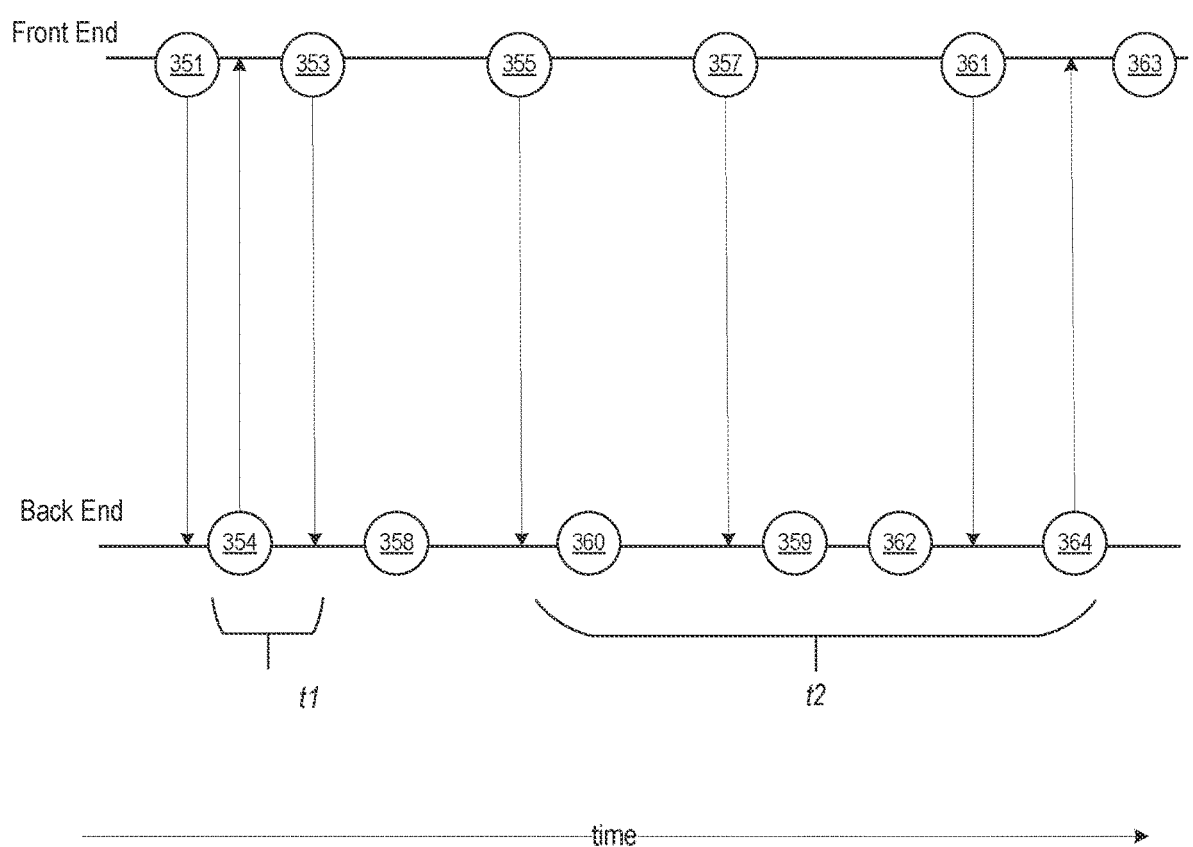
FIG. 3B is a timing diagram of an example method for switching content in accordance with some embodiments of the present disclosure.

FIG. 3B is a timing diagram of an example method for switching content in accordance with some embodiments of the present disclosure.

Portions of the method 350 are performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 350 is performed by the content switcher 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In FIG. 3B, a front end, such as user interface 112, generates a first signal 351, such as a page load request, during a user session. When a back end, such as a content serving component and/or content switching component of application software system 130, receives the first signal 351, the back end generates a first ranked list 354 of content items using a first ranking mechanism such as the session-based ecpi mechanism described above. When the front end receives the first ranked list 354, the front end renders a first subset 353 of the first ranked list in a feed, such as feed 114, during the user session. A second subset 358 of the first ranked list is stored in a cache that is accessible to back end; for example, feed cache 316.

The front end generates second signals containing user activity data 355, 357 during the user session; for example while the user is browsing the feed. A back end process, such as a component of feed-mixer stack 303, generates and stores in server-side cache third signals 359 containing feed context data (e.g., slot position context data). Another back end process generates second ranked lists 360, 362 asynchronously while the second signals containing user activity data 355, 357, and the server-side cached third signals 359 containing feed context data 359 are being obtained. For example, when the back end receives user activity data 355, the back end generates a second ranked list 360. When the back end receives user activity data 357 and feed context data 359, the back end generates another second ranked list 362. The second ranked list 360 is, for example, a revised version of the first ranked list 354. The second ranked list 362 is, for example, another revised version of the first ranked list 354 that may be different from the second ranked list 360. The second ranked lists 360, 362 are determined by the back end using a second ranking mechanism such as the position-based ecpi mechanism described above.

Front end generates a fourth signal, such as a pagination signal 361, which triggers, for example, a scroll-to-load mechanism. When back end receives the fourth signal 361, the back end provides the most recently generated second ranked list 364, which has been generated by the back end using a second ranking mechanism such as the position-based ecpi mechanism, to the front end. The front end renders at least a portion 363 of second ranked list 364 in the feed.

As shown in FIG. 3B, an elapsed time or latency, t1, for the back end to generate the first ranked list 356 is much smaller than the elapsed time or latency, t2, for the back end to generate the second ranked list 364 that is ultimately rendered by the front end in response to the pagination signal 361. This asynchronous ranking architecture enables the back end to continue incorporating extra signals (e.g., user activity and contextual signals) into the ranking process used by the second ranking mechanism while the user is interacting with the first ranked list. In contrast to the first ranking mechanism, the second ranking mechanism can utilize more complex ranking techniques, including techniques that may require longer computational times.

Figure 4A:
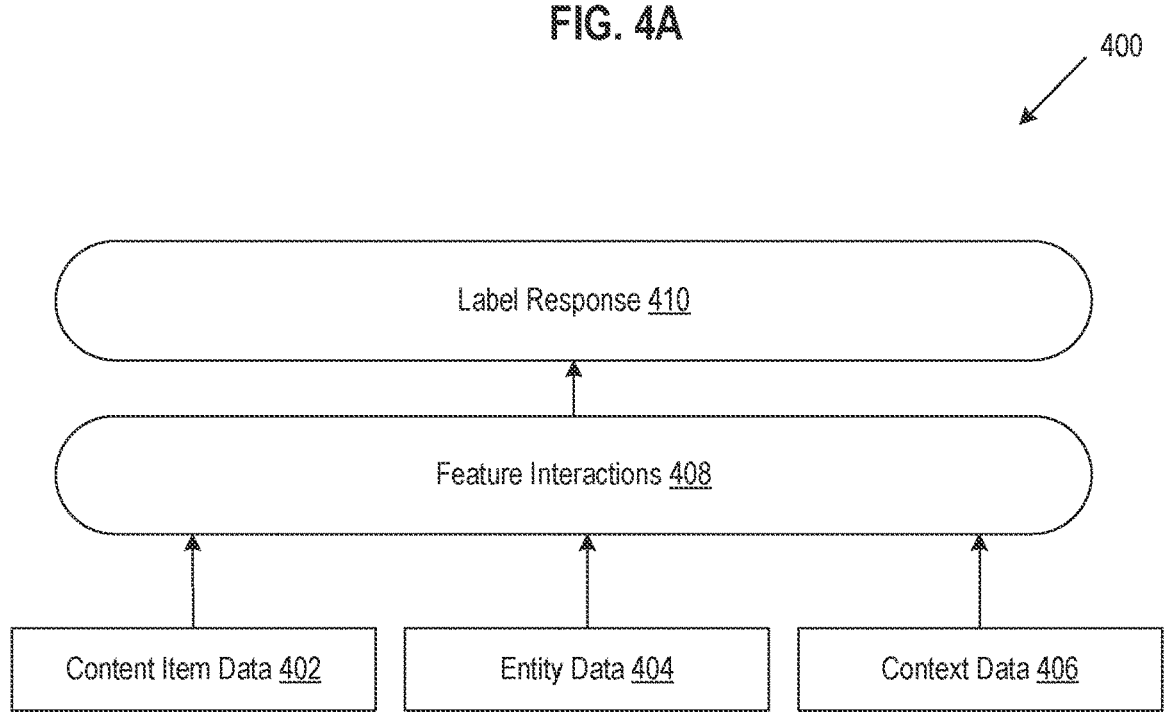
FIG. 4A is a flow diagram of an example ranking mechanism in accordance with some embodiments of the present disclosure.

FIG. 4A is a flow diagram of an example ranking mechanism in accordance with some embodiments of the present disclosure.

The method 400 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the application software system 130 and/or the content switcher 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In FIG. 4A, the method 400 includes operations performed by an embodiment of a second ranking mechanism that includes a ranking model having layers 408, 410. Content item data 402, entity data 404, and context data 406 are inputs to feature interactions layer 408. Feature interactions layer 408 processes the inputs and applies a ranking algorithm to the processed inputs. For example, feature interactions layer 408 concatenates the inputs and/or generates embeddings from one or more of the inputs. Feature interactions layer 408 produces output such as probabilistic values generated by a position-based ecpi mechanism. The output of feature interactions layer 408 is received by label response layer 410. Label response layer 410 transforms the output of feature interactions layer 408 into labels. For example, label response layer 410 converts probabilistic values to numerical slot positions.

Figure 4B:
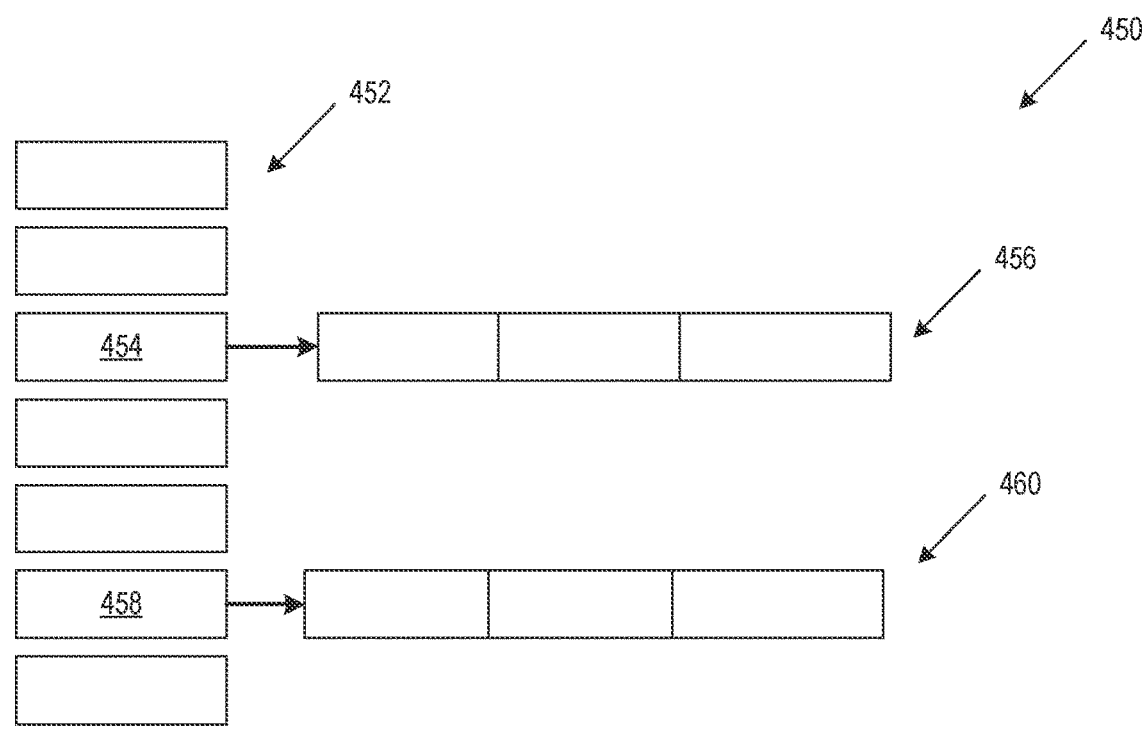
FIG. 4B is a flow diagram of an example of a position-based auction in accordance with some embodiments of the present disclosure.

FIG. 4B is a flow diagram of an example of a position-based auction in accordance with some embodiments of the present disclosure.

The method 450 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 450 is performed by the application software system 130 and/or the content switcher 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In FIG. 4B, a ranked list of content items 452 includes, for example, a third content item at a third slot position 454 and a sixth content item at a sixth slot position 458. Third slot position 454 is higher than sixth slot position 458 in terms of rank order, such that a content item with a higher ranking score would be assigned to third slot position 454 and not sixth slot position 458. An auction process to rank and select content items is run at each slot position of the ranked list 452. Thus, in contrast to the session-based auction process that generates a single ranked list for an entire session, the method 450 runs a position-based auction process at each slot position. Thus, the number of auction processes run by the method 450 corresponds to the number of available slots in the feed.

For example, a third auction process is run at third slot position 454 and a sixth auction process is run at sixth slot position 458. In the third auction process, the position-based ranking mechanism is applied to a third set of content items 456 considering the value of slot position 454 and any associated slot position context data (such as interaction data associated with the preceding slots). In the sixth auction process, the position-based ranking mechanism is applied to a sixth set of content items 460 and incorporates the value of slot position 458 and any associated context data into the ranking. In this way, the method 450 can select the highest ranking content item for each particular slot, based on that slot's specific position in the feed and any context data associated with that position.

Additionally, since the auction process is re-run for each slot, the ranking process can be optimized based on different sets of contextual signals. For example, the content items rendered in the feed earlier than the third slot position 454 could be very different from the signals associated with content items rendered in the feed between the third slot position 454 and the sixth slot position 458. As such, the method 450 can adapt to these slot-specific differences in contextual signals.

Figure 4C:
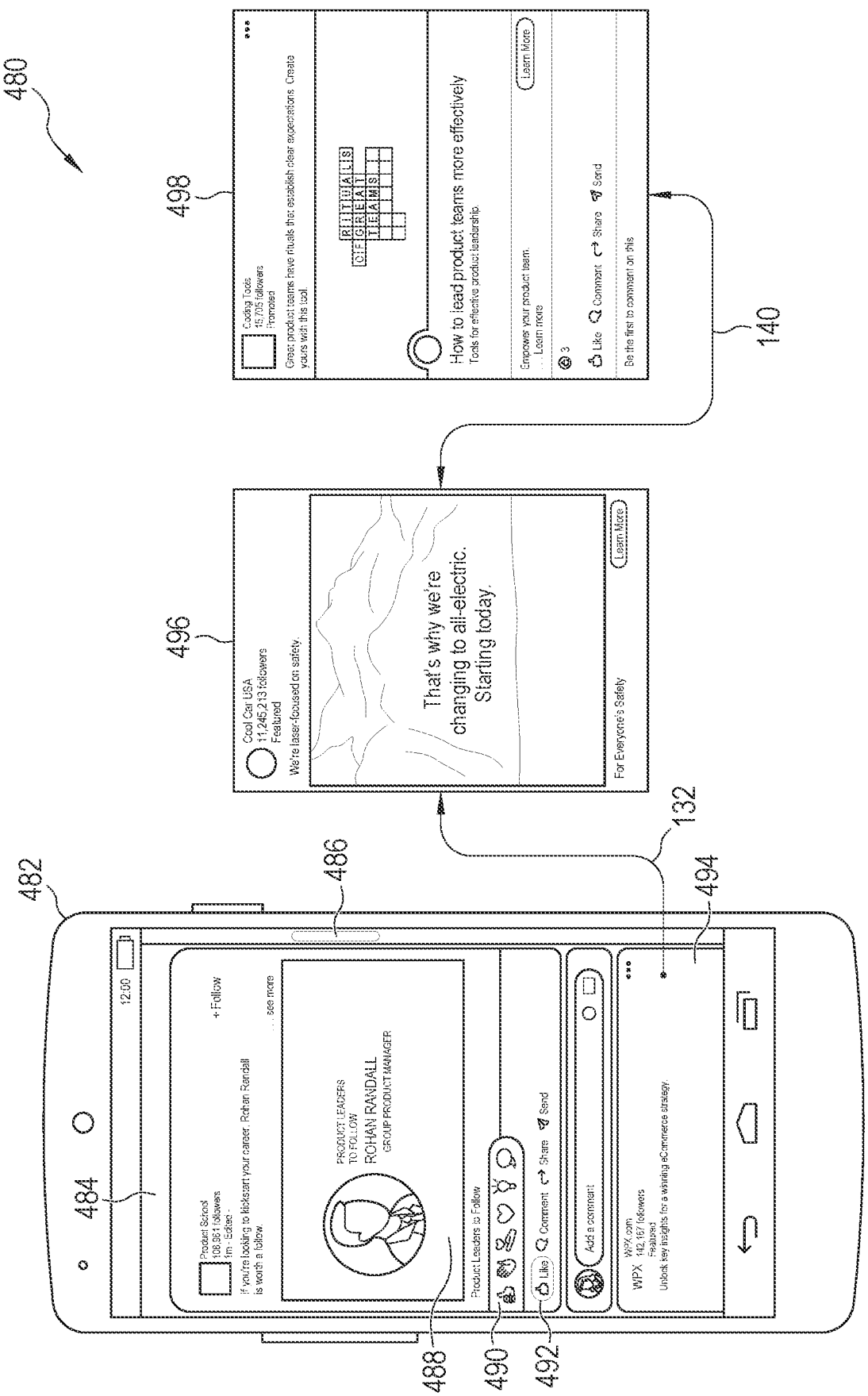
FIG. 4C is a flow diagram of an example implementation of a content switching method in accordance with some embodiments of the present disclosure.

FIG. 4C is a flow diagram of an example implementation of a content switching method in accordance with some embodiments of the present disclosure.

The method 480 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 480 is performed by the application software system 130 and/or the content switcher 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In FIG. 4C, a user system such as a mobile device 482 renders a feed 484. A back end portion of the user system includes content serving system 132 using a first ranking mechanism to create a first ranked list of content items to include in the feed. The first ranked list includes a first content item 488, a second content item 494, a third content item 496, and a fourth content item 498. In the feed 484, initially the first content item 488 is rendered and visible to the user. The user system generates user interactions 490, 492 (e.g., like, thumbs up) with the first content item 488. When the user activates a scroll bar 486, a portion of the second content item 494 becomes visible in the feed 484.

While the user is interacting with the feed, the asynchronous content switcher 140 performs at least one in-session, position-based ranking of the not-yet-rendered content items (e.g., content items 496, 498) using a second ranking mechanism that incorporates the user interactions 490, 492 as well as feed context data such as the slot positions of first content item 488, second content item 494, and/or third content item 496, into the position-based ranking.

The ranking by the asynchronous content switcher 140 ranks the fourth content item 498 more highly than the third content item 496. For example, even though the third content item 496 has many more followers than the fourth content item 498, the fourth content item 498 is ranked higher than the third content item 496 asynchronous content switcher 140 because the asynchronous content switcher 140 has access to the user activity data indicating that the user interacted with the first content item 488 and both the first content item 488 and the fourth content item 498 relate to product management or leadership while the third content item 496 relates to a different topic that the user has not interacted with during the user session.

As a result of the ranking performed using the position-based ranking mechanism, the asynchronous content switcher 140 assigns the fourth content item 498 to the slot that was assigned to the third content item 496 by the content serving system 132 using first ranking mechanism and assigns the third content item 496 to the slot that was assigned to the fourth content item 498 by the content serving system 132 using first ranking mechanism. In other words, asynchronous content switcher 140 switches the slot positions of the third content item 496 and the fourth content item 498 before those content items are rendered in the feed.

The activation of the scroll bar 486 and/or the partial rendering of the second content item 494 triggers the asynchronous content switcher 140 to load the fourth content item 498 into the third slot instead of the third content item 496 so that the fourth content item 498 is rendered after the second content item 494 instead of after the third content item 496.

FIG. 5 is a flow diagram of an example method for switching content in accordance with some embodiments of the present disclosure.

The method 500 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the content switcher 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing device creates a first ranked list of content items. In some embodiments, the processing device creates the first ranked list using a first ranking mechanism that does not include user activity data generated after the receiving of the first signal or slot position context data generated after the receiving of the first signal. In some embodiments, the processing device creates the first ranked list in response to a first signal from a user system, such as a page load request.

At operation 504, the processing device assigns a first subset of the first ranked list to a first set of slots of a user session. The number of slots in the first set of slots corresponds to the number of slots that are initially rendered in the feed on the user system. For example, if the user system displays three slots of the feed after the page load, then the first subset contains the top three content items of the first ranked list and those content items are assigned to the three visible slots.

At operation 506, the processing device assigns a second subset of the first ranked list to a second set of slots having lower positions than the first set of slots in the user session. The second set of slots does not include the first set of slots. That is, the second set of slots includes the slots that are not yet rendered in the feed. The number of slots in the second set of slots corresponds to the total number of remaining slots in the feed for the entire session. For instance, if a feed for an entire session contains one hundred slots and there are three slots in the first set of slots, then the second set of slots contains ninety-seven slots. The second subset of the first ranked list contains content items assigned to the second set of slots. Thus, in the foregoing example, the second subset contains ninety-seven content items arranged in rank order according to the ranking performed in operation 502.

At operation 508, the processing device receives second and third signals containing user activity data and corresponding slot position context data from the user session. To receive user activity data, the processing device accesses or queries a real-time or near-real time data store that stores streams of user activity data for the session. To receive slot position context data, the processing device accesses or queries a cache into which the slot position context data is written as content items are loaded into slots and rendered in the feed.

At operation 510, the processing device uses the received user activity and corresponding slot position context data to create a second ranked list of content items from the second subset and a set of content items that does not include the first ranked list. In some embodiments, the processing device creates the second ranked list asynchronously with the receiving of user activity data from the user session. In some embodiments, the processing device continuously re-creates the second ranked list asynchronously while receiving user activity signals from the user session.

In some embodiments, the processing device creates the second ranked list by computing a probability of user response to a content item not in the first subset based on the user activity data, the slot position context data, and content item data associated with the position context data, and determines the second ranked list based on the computed probability.

In some embodiments, the processing device computes a first score for a first content item of the second subset; computes a second score for a second content item retrieved from a set of content items that does not include the first subset or the second subset; determines whether a difference between the first score and the second score satisfies a ranking criterion; and in response to determining that the difference between the first score and the second score satisfies the ranking criterion, includes the second content item in the second ranked list instead of the first content item. For example, the ranking criterion is that the second score is greater than the first score. In another example, the ranking criterion is that the difference between the first score and the second score is greater than a threshold, where the threshold is set based on the requirements of a particular design of the computing system 100. In some embodiments, the processing device retrieves a content item from a set of content items that does not include the first subset and does not include the second subset; and based on the user activity data and the slot position context data, replaces a content item of the second subset with the retrieved content item.

In some embodiments, the processing device adjusts the density of particular types of content items in the feed by using the asynchronous content switcher to perform group by group ranking. For example, the processing device divides the entire feed into multiple different groups, and then performs the asynchronous content switching on a group-by-group basis. For instance, the content switching ranking mechanism (e.g., mechanism 324) divides the feed into three groups of content items and performs re-ranking of the items in group 3 while the user is viewing the content in group 2. The processing device writes the re-ranked group 3 items into a content item cache (e.g., cache 328) while the user is viewing and scrolling through the group 2 content.

In some embodiments, the processing device repeats the group-based ranking multiple times for one or more particular groups. For example, if the processing device receives strong user activity signals (such as like, comment, share of a particular content item), the processing device can immediately re-rank the group 3 content items and write the re-ranked set of group 3 items to the content item cache. For example, the processing device could perform the asynchronous content switching on the group 3 items a first time, as the group 2 items are rendered in the feed. Then, in response to receiving user activity signals from the display of the group 2 items, the processing device could re-perform the asynchronous content switching on the group 3 items again and update the content item cache before the group 3 items are rendered in the feed.

In some embodiments, to avoid showing a duplicate content item in the feed session (e.g., the same content item is shown more than once at different positions in the feed), the processing device performs a deduplication function or rendered dedup. For example, the processing device creates a "rendered cache" and whenever first pass ranking mixer 312 or content switching mechanism 334 provides the content items (e.g., 313 or 335) to feed 114, the processing device also writes those rendered content items 313, 335 into the rendered cache. At a later time during the session, when content switching ranking mechanism 324 is loading new content into content item store 302, the processing device also loads the already-rendered content from the rendered cache and then filters out the previously rendered contents (e.g., 313 or 335), to avoid showing the same content again. In this way, the processing device keeps track of content items that have been rendered in a separate cache in order to ensure that the asynchronous content switcher does not provide them to the feed again at a later time.

In some embodiments, the processing device stores the second subset and slot position context data associated with the second subset in a cache; reads the slot position context data from the cache; and creates the second ranked list using the slot position context data read from the cache.

At operation 512, the processing device assigns the second ranked list instead of the second subset to the second set of slots.

In some embodiments, for a content item of the second ranked list, the processing device determines whether a distribution criterion is satisfied; and in response to determining that the distribution criterion is not satisfied, the processing device assigns the content item to a slot of the second plurality of slots. An example of a distribution criterion is a limit on content distribution, such as a per-distributor limit on the number of content items or on the amount of time a content item is shown in the feed.

In some embodiments, the processing device applies an auction process to a position of a slot in the second plurality of slots, and based on an output of the auction process, assigns a content item of the second ranked list to the slot.

In some embodiments, the processing device receives a fourth signal, such as a pagination signal, from the user session. Based on the fourth signal, the processing device renders the second ranked list instead of the second subset in the second plurality of slots.

Figure 6:
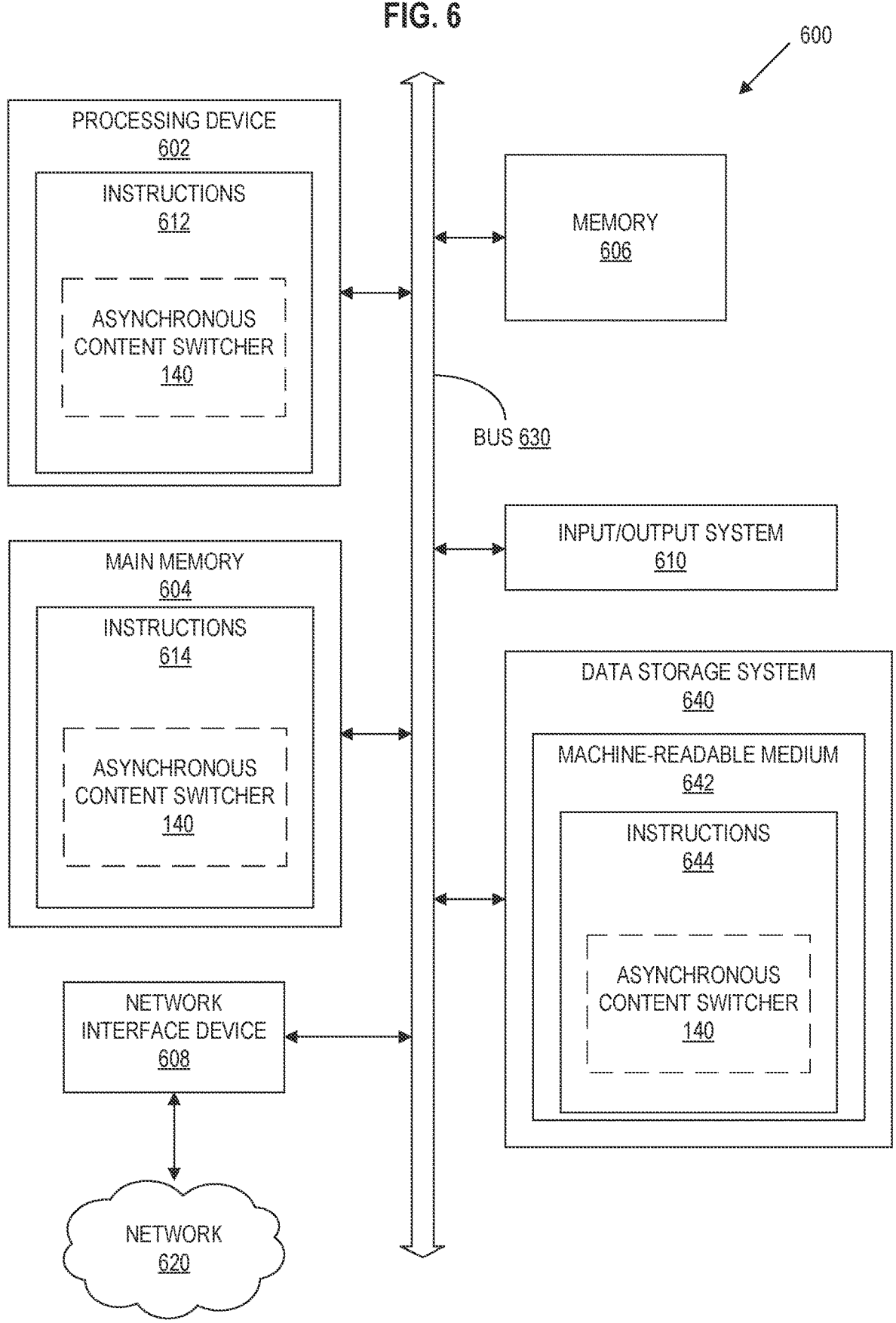
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a component of a networked computer system (e.g., the computer system 100 of FIG. 1) that includes, is coupled to, or utilizes a machine to execute an operating system to perform operations corresponding to the application software system 130, including the content switcher 140 of FIG. 1.

The machine is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a memory 606 (e.g., flash memory, static random access memory (SRAM), etc.), an input/output system 610, and a data storage system 640, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 612 for performing the operations and steps discussed herein.

Instructions 612 include portions the application software system 130 when those portions of the first party system are being executed by processing device 602. Thus, similar to the description above, content switcher 140 is shown in dashed lines as part of instructions 612 to illustrate that, at times, portions of content switcher 140 are executed by processing device 602. For example, when at least some portion of content switcher 140 is embodied in instructions to cause processing device 602 to perform the method(s) described above, some of those instructions can be read into processing device 602 (e.g., into an internal cache or other memory) from main memory 604 and/or data storage system 640. However, it is not required that all of the content switchers be included in instructions 612 at the same time and portions of the content switcher are stored in one or more other components of computer system 600 at other times, e.g., when one or more portions of the content switcher are not being executed by processing device 602.

The computer system 600 further includes a network interface device 608 to communicate over the network 620. Network interface device 608 provides a two-way data communication coupling to a network. For example, network interface device 608 can be an integrated-services digital network (ISDN) card, cable modem, satellite modem, or a modem to provide a data communication connection to a corresponding type of telephone line. As another example, network interface device 608 can be a local area network (LAN) card to provide a data communication connection to a compatible LAN. Wireless links can also be implemented. In any such implementation network interface device 608 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 600.

Computer system 600 can send messages and receive data, including program code, through the network(s) and network interface device 608. In the Internet example, a server can transmit a requested code for an application program through the Internet and network interface device 608. The received code can be executed by processing device 602 as it is received, and/or stored in data storage system 640, or other non-volatile storage for later execution.

The input/output system 610 includes an output device, such as a display, for example a liquid crystal display (LCD) or a touchscreen display, for displaying information to a computer user, or a speaker, a haptic device, or another form of output device. The input/output system 610 can include an input device, for example, alphanumeric keys and other keys configured for communicating information and command selections to processing device 602. An input device can, alternatively or in addition, include a cursor control, such as a mouse, a trackball, or cursor direction keys for communicating direction information and command selections to processing device 602 and for controlling cursor movement on a display. An input device can, alternatively or in addition, include a microphone, a sensor, or an array of sensors, for communicating sensed information to processing device 602. Sensed information can include voice commands, audio signals, geographic location information, and/or digital imagery, for example.

The data storage system 640 includes a machine-readable storage medium 642 (also known as a computer-readable medium) on which is stored one or more sets of instructions 644 or software embodying any one or more of the methodologies or functions described herein. The instructions 644 can also reside, completely or at least partially, within the main memory 604 and/or within the processing device 602 during execution thereof by the computer system 600, the main memory 604 and the processing device 602 also constituting machine-readable storage media.

In one embodiment, the instructions 644 include instructions to implement functionality corresponding to a content switcher of a first party system (e.g., the content switcher 140 of FIG. 1).

Dashed lines are used in FIG. 6 to indicate that it is not required that the content switcher be embodied entirely in instructions 612, 614, and 644 at the same time. In one example, portions of the content switcher are embodied in instructions 644, which are read into main memory 604 as instructions 614, and portions of instructions 614 are read into processing device 602 as instructions 612 for execution. In another example, some portions of the content switcher are embodied in instructions 644 while other portions are embodied in instructions 614 and still other portions are embodied in instructions 612.

While the machine-readable storage medium 642 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented methods 300A, 300B, 300C, 100, 500 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

In an example 1, a method includes receiving a first signal from a user session; creating a first ranked list of content items; based on the first signal, assigning a first subset of the first ranked list to a first set of slots of the user session; assigning a second subset of the first ranked list to a second set of slots of the user session; the second subset does not include the first subset; the second set of slots does not include the first set of slots; receiving at least one second signal from the user session; the at least one second signal includes user activity data associated with a rendering of the first subset in the first set of slots; receiving at least one third signal from the user session; the at least one third signal includes position context data associated with the rendering of the first subset in the first set of slots; based on the user activity data and the position context data, creating a second ranked list of content items; the second ranked list does not include the first subset; and assigning the second ranked list instead of the second subset to the second set of slots.

An example 2 includes the subject matter of example 1, further including: creating the second ranked list asynchronously with the receiving of the at least one second signal from the user session. An example 3 includes the subject matter of examples 1 or example 2, where creating the second ranked list includes: computing a probability of user response to a content item not in the first subset based on the user activity data, the position context data, and content item data associated with the position context data; and determining the second ranked list based on the computed probability. An example 4 includes the subject matter of any of examples 1-3, further including: creating the first ranked list using a first ranking mechanism that does not include user activity data generated after the receiving of the first signal or position context data generated after the receiving of the first signal. An example 5 includes the subject matter of any of examples 1-4, further including: receiving a fourth signal from the user session; and based on the fourth signal, rendering the second ranked list instead of the second subset in the second set of slots. An example 6 includes the subject matter of any of examples 1-5, further including: for a content item of the second ranked list, determining whether a distribution criterion is satisfied; and in response to determining that the distribution criterion is not satisfied, assigning the content item to a slot of the second set of slots. An example 7 includes the subject matter of any of examples 1-6, further including: applying an auction process to a position of a slot in the second set of slots; and based on an output of the auction process, assigning a content item of the second ranked list to the slot. An example 8 includes the subject matter of any of examples 1-7, where creating the second ranked list includes: retrieving a content item from a set of content items that does not include the first subset and does not include the second subset; and based on the user activity data and the position context data, replacing a content item of the second subset with the retrieved content item. An example 9 includes the subject matter of any of examples 1-8, where creating the second ranked list includes: dividing the second ranked list into a set of groups; and based on at least one of the user activity data or the position context data, re-ranking at least one group of the set of groups at least once before the at least one group is rendered. An example 10 includes the subject matter of any of examples 1-19, further including: storing a content item rendered in the first subset in a rendered cache; and removing the content item stored in the rendered cache from the second ranked list. An example 11 includes the subject matter of any of examples 1-10, further including: computing a first score for a first content item of the second subset; computing a second score for a second content item retrieved from a set of content items that does not include the first subset or the second subset; determining whether a difference between the first score and the second score satisfies a ranking criterion; and in response to determining that the difference between the first score and the second score satisfies the ranking criterion, including the second content item in the second ranked list instead of the first content item. An example 12 includes the subject matter of any of examples 1-11, further including: storing the second subset and position context data associated with the second subset in a cache; reading the position context data from the cache; and creating the second ranked list using the position context data read from the cache. An example 13 includes the subject matter of any of examples 1-12, further including: receiving a fourth signal from the user session; determining that the fourth signal includes a pagination mechanism; and rendering the second ranked list instead of the second subset in the second set of slots.

In an example 14, a system includes at least one processor; and at least one memory coupled to the at least one processor; the at least one memory including instructions that when executed by the at least one processor cause the at least one processor to be capable of: creating a first ranked list of content items; assigning a first subset of the first ranked list to a first set of slots of a user session; assigning a second subset of the first ranked list to a second set of slots having lower positions than the first set of slots in the user session; receiving user activity data and corresponding slot position context data from the user session; using the received user activity and corresponding slot position context data, creating a second ranked list of content items from the second subset and a set of content items that does not include the first ranked list; and assigning the second ranked list instead of the second subset to the second set of slots.

An example 15 includes the subject matter of example 14, where the instructions, when executed by the at least one processor, cause the at least one processor to be capable of: continuously re-creating the second ranked list asynchronously while receiving signals from the user session. An example 16 includes the subject matter of example 14 or example 15, where the instructions, when executed by the at least one processor, cause the at least one processor to be capable of: computing a probability of user response to a content item not in the first subset based on the user activity data, the slot position context data, and content item data associated with the slot position context data; and determining the second ranked list based on the computed probability. An example 17 includes the subject matter of any of examples 14-16, where the instructions, when executed by the at least one processor, cause the at least one processor to be capable of: for a content item of the second ranked list, determining whether a distribution criterion is satisfied; and in response to determining that the distribution criterion is not satisfied, assigning the content item to a slot of the second set of slots. An example 18 includes the subject matter of any of examples 14-17, where the instructions, when executed by the at least one processor, cause the at least one processor to be capable of: applying an auction process to a position of a slot in the second set of slots; and based on an output of the auction process, assigning a content item of the second ranked list to the slot. An example 19 includes the subject matter of any of examples 14-18, where the instructions, when executed by the at least one processor, cause the at least one processor to be capable of: retrieving a content item from a set of content items that does not include the first subset and does not include the second subset; and based on the user activity data and the slot position context data, replacing a content item of the second subset with the retrieved content item. An example 20 includes the subject matter of any of examples 14-19, where the instructions, when executed by the at least one processor, cause the at least one processor to be capable of: determining whether a comparison of at least one content item of the second ranked list to at least one content item of the first ranked list satisfies a similarity criterion; and in response to determining that the comparison satisfies the similarity criterion, removing at least one content item from the second ranked list.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

The invention claimed is:

1. A method comprising:
receiving a first signal from a user session;
creating a first ranked list of content items;

based on the first signal, assigning a first subset of the first ranked list to a first plurality of slots of the user session;
assigning a second subset of the first ranked list to a second plurality of slots of the user session;
the second subset does not include the first subset;
the second plurality of slots does not include the first plurality of slots;
receiving at least one second signal from the user session;
the at least one second signal comprises user activity data associated with a rendering of the first subset in the first plurality of slots;
receiving at least one third signal from the user session;
the at least one third signal comprises position context data associated with the rendering of the first subset in the first plurality of slots;
based on the user activity data and the position context data, creating a second ranked list of content items asynchronously with the receiving of the at least one second signal from the user session;
the second ranked list does not include the first subset; and
assigning the second ranked list instead of the second subset to the second plurality of slots.

2. The method of claim 1, wherein creating the second ranked list comprises:
computing a probability of user response to a content item not in the first subset based on the user activity data, the position context data, and content item data associated with the position context data; and
determining the second ranked list based on the computed probability.

3. The method of claim 1, further comprising:
creating the first ranked list using a first ranking mechanism that does not include user activity data generated after the receiving of the first signal or position context data generated after the receiving of the first signal.

4. The method of claim 1, further comprising:
receiving a fourth signal from the user session; and
based on the fourth signal, rendering the second ranked list instead of the second subset in the second plurality of slots.

5. The method of claim 1, further comprising:
for a content item of the second ranked list, determining whether a distribution criterion is satisfied; and
in response to determining that the distribution criterion is not satisfied, assigning the content item to a slot of the second plurality of slots.

6. The method of claim 1, further comprising:
applying an auction process to a position of a slot in the second plurality of slots; and
based on an output of the auction process, assigning a content item of the second ranked list to the slot.

7. The method of claim 1, wherein creating the second ranked list comprises:
retrieving a content item from a set of content items that does not include the first subset and does not include the second subset; and
based on the user activity data and the position context data, replacing a content item of the second subset with the retrieved content item.

8. The method of claim 1, wherein creating the second ranked list comprises:
dividing the second ranked list into a plurality of groups; and
based on at least one of the user activity data or the position context data, re-ranking at least one group of the plurality of groups at least once before the at least one group is rendered.

9. The method of claim 1, further comprising:
storing a content item rendered in the first subset in a rendered cache; and
removing the content item stored in the rendered cache from the second ranked list.

10. The method of claim 1, further comprising:
computing a first score for a first content item of the second subset;
computing a second score for a second content item retrieved from a set of content items that does not include the first subset or the second subset;
determining whether a difference between the first score and the second score satisfies a ranking criterion; and
in response to determining that the difference between the first score and the second score satisfies the ranking criterion, including the second content item in the second ranked list instead of the first content item.

11. The method of claim 1, further comprising:
storing the second subset and position context data associated with the second subset in a cache;
reading the position context data from the cache; and
creating the second ranked list using the position context data read from the cache.

12. The method of claim 11, further comprising:
receiving a fourth signal from the user session;
determining that the fourth signal comprises a pagination mechanism; and
rendering the second ranked list instead of the second subset in the second plurality of slots.

13. A system comprising:
at least one processor; and
at least one memory coupled to the at least one processor;
the at least one memory comprising instructions that when executed by the at least one processor cause the at least one processor to be capable of:
creating a first ranked list of content items;
assigning a first subset of the first ranked list to a first set of slots of a user session;
assigning a second subset of the first ranked list to a second set of slots having lower positions than the first set of slots in the user session;
receiving user activity data and corresponding slot position context data from the user session;
using the received user activity and corresponding slot position context data, creating a second ranked list of content items from the second subset and a set of content items that does not include the first ranked list;
assigning the second ranked list instead of the second subset to the second set of slots; and
continuously re-creating the second ranked list asynchronously while receiving signals from the user session.

14. The system of claim 13, wherein the instructions, when executed by the at least one processor, cause the at least one processor to be capable of:
computing a probability of user response to a content item not in the first subset based on the user activity data, the slot position context data, and content item data associated with the slot position context data; and
determining the second ranked list based on the computed probability.

15. The system of claim 13, wherein the instructions, when executed by the at least one processor, cause the at least one processor to be capable of:
for a content item of the second ranked list, determining whether a distribution criterion is satisfied; and in response to determining that the distribution criterion is not satisfied, assigning the content item to a slot of the second set of slots.

16. The system of claim 13, wherein the instructions, when executed by the at least one processor, cause the at least one processor to be capable of:
 applying an auction process to a position of a slot in the second set of slots; and
 based on an output of the auction process, assigning a content item of the second ranked list to the slot.

17. The system of claim 13, wherein the instructions, when executed by the at least one processor, cause the at least one processor to be capable of:
 retrieving a content item from a set of content items that does not include the first subset and does not include the second subset; and
 based on the user activity data and the slot position context data, replacing a content item of the second subset with the retrieved content item.

18. The system of claim 13, wherein the instructions, when executed by the at least one processor, cause the at least one processor to be capable of:
 determining whether a comparison of at least one content item of the second ranked list to at least one content item of the first ranked list satisfies a similarity criterion; and
 in response to determining that the comparison satisfies the similarity criterion, removing at least one content item from the second ranked list.

* * * * *